(12) United States Patent
St. Peter

(10) Patent No.: US 6,394,401 B1
(45) Date of Patent: May 28, 2002

(54) ADJUSTABLE BOUQUET DESIGN STAND

(76) Inventor: Larry St. Peter, 520 Division St., Hubbell, MI (US) 49934

( * ) Notice: Subject to any disclaimer, the term of this patent is extended or adjusted under 35 U.S.C. 154(b) by 0 days.

(21) Appl. No.: 09/499,869

(22) Filed: Feb. 7, 2000

(51) Int. Cl.[7] .................................................. F16L 3/00
(52) U.S. Cl. .................................. 248/122.1; 248/27.8
(58) Field of Search ............................. 248/122.1, 27.8, 248/125.8, 125.9, 405, 413, 409, 408, 314; 24/508, 509

(56) References Cited

U.S. PATENT DOCUMENTS

| | | |
|---|---|---|
| 811,712 A | 2/1906 | Graefe |
| 911,149 A | 2/1909 | Moore |
| 1,396,445 A | 11/1921 | Loudon |
| 1,609,246 A | 11/1926 | Hamburger |
| 2,553,103 A * | 5/1951 | Miller ........................ 248/27.8 |
| 2,724,569 A * | 11/1955 | Licata ......................... 43/21.2 |
| 2,984,045 A | 5/1961 | Eggan |
| 3,415,475 A | 12/1968 | Goodman |
| D221,970 S | 9/1971 | Kelly |
| 3,708,141 A * | 1/1973 | Friedgen et al. ............ 248/515 |
| 4,339,104 A * | 7/1982 | Weidman .................... 248/407 |
| 4,359,786 A | 11/1982 | Rosberg et al. |
| D276,287 S | 11/1984 | Sturcz et al. |
| D280,395 S | 9/1985 | Cheng et al. |
| 4,597,550 A | 7/1986 | Rice, Sr. |
| 5,094,415 A | 3/1992 | Revette et al. |
| 5,732,830 A | 3/1998 | Harrington |

FOREIGN PATENT DOCUMENTS

| | | |
|---|---|---|
| JP | 11299612 | * 11/1999 |
| WO | WO 92/10085 | 6/1992 |

* cited by examiner

*Primary Examiner*—Ramon O. Ramirez
*Assistant Examiner*—Holly N. Sy
(74) *Attorney, Agent, or Firm*—Gene Scott-Patent Law & Venture Group

(57) ABSTRACT

The present invention provides a ADJUSTABLE BOUQUET DESIGN STAND which includes a positioning stand and a flower stems receiver. The positioning stand can be adapted to a wall or a floor attachment, and is enabled for being adjusted in height and for pivotal motion around the stand's longitudional axis. The invention also provides for fixed positioning of the flower stems receiver, thus enabling an essentially infinite number of fixed variations of the flower stand's height and attitude necessary for a flower bouquet designing. Additionally, the flower stems receiver is provided with a clamping device which has a manual lever located on the flower stems receiver's peripheral wall and a spring member which is enabled for clamping the flower stems to the inner wall of the stem receiver in a diagonal direction. As the flowers are placed between inner walls of the flower stems receiver, application of pressure by a human hand to the manual lever enables clamping of the flower stems to the inner wall of the receiver with a downwardly directed, and thus a greater clamping force, thereby inhibiting the flowers from being easily pulled from the stems receiver.

9 Claims, 2 Drawing Sheets

ADJUSTABLE BOUQUET DESIGN STAND

BACKGROUND OF THE INVENTION

1. Field of the Invention

This invention relates generally to flower stands, and more particularly to a positionable flower stand with features adapted for linear extension, rotation and pivotal motion of the flower' stems receiver, wherein the flower' stems receiver is enabled for clamping of the flower' stems against the inner wall thereof with a downwardly directed force.

2. Description of Related Art

The following art defines the present state of this field:

Kelly, U.S. Pat. No. D221,970 describes the ornamental design for an extensible flower stand.

Sturcz et al., U.S. Pat. No. D276,287 describes a flower pot stand characterized by a pair of circular members defining the top and bottom in combination with a triangulated conical pedestal.

Chang et al., U.S. Pat. No. D280,395 describes an ornamental design for and adjustable holder for flowers, plants, and the like.

Graefe, U.S. Pat. No. 811,712 describes a support comprised of a base, a standard projecting from the base and having a cylindrical bore, a cylindrical stem adjustable within said bore and having a series of circumferential shoulders or projections, means carried by the standard for engaging said shoulders, and a table or platform carried by the stem.

Moore, U.S. Pat. No. 911,149 describes a base and a top disk in combination with a standard comprising telescopic tubular members secured to said base and said top respectively, the outer member having a longitudinal slot and said slot having oppositely disposed substantially semicircular recesses arranged at intervals, a screw threaded into the inner tubular member and a collar on said screw, the stem of the screw being adapted to pass freely along said slot and said collar being adapted to fit within said recesses.

Loudon, U.S. Pat. No. 1,396,445 describes a stand including a spider, means for supporting said spider, arms, sleeves forming portions of said arms, said sleeves being adapted to encircle said spider arms, said spider arms being formed with recesses in their under faces, a set screw secured to the under side of said sleeve, the end of said set screw being adapted to project into the recesses of said latter arms, said spider arms presenting channel portions, walls forming end portions for said channels, the upper edge of each of said walls being formed with a recess whereby said sleeves may be reversed and said set screw may be caused to engage the said latter recess.

Hamburger, U.S. Pat. No. 1,609,246 describes a display stand for flowers comprised of a base, a tubular member mounted on said base, a sliding rod mounted for vertical adjustment in the tubular member, a disc removably connected with the upper end of the rod and provided with upstanding arms at diametrically opposite points, the upper end of the arms being provided with perforations, a ring provided with a laterally projecting pintle adapted to engage the perforations of one arm, said ring being provided with an enlargement projecting laterally from the outer wall of the ring at a point which is diametrically opposite the pintle, said enlargement and ring being provided with a threaded passage, an adjusting bolt passing through the perforation in the second arm and having a threaded engagement with the passage in the enlargement of the ring for locking the ring in position, the enlargement being provided with a v-shaped bottom, a shoulder on the second mentioned arm adapted to be engaged by the sides of the v-shaped bottom of the enlargement and cooperating with the adjusting bolt for locking the ring in a plurality of titled positions.

Eggan, U.S. Pat. No. 2,984,045 describes a holder and means for supporting cut flowers or the like in the holder comprised of a container including an upstanding wall, said wall having at least one vertically elongated opening therein, a mass of flower supporting material nested in said container below said opening, a flat strip of resiliently flexible shape-retaining material extended through said opening, said strip extending inwardly downwardly to dispose its innermost end in engagement with said mass inwardly radially of the wall, and notches adjacent the other end of said strip contactingly embracing the marginal areas of the wall at the vertical edges of the opening for retaining the strip in place, said strip being of a width to permit its passage freely through the opening when disposed in a plane substantially parallel with the longest dimension of the opening.

Goodman, U.S. Pat. No. 3,415,475 describes a weighted base for supporting a utilitarian device comprised of a generally non-metallic horizontally extending weighted support base including a molded shell of generally resilient plastic having a cavity therein filled with a solidified dense material, said shell being provided with a centrally and vertically disposed vertically extending cylindrical member defining a through aperture to facilitate coupling a utilitarian device to said weighted base, and said shell having a generally disk-like configuration characterized by a generally planar lower surface.

Rosberg et al., U.S. Pat. No. 4,359,786 describes a urinal stand of a construction that includes a heavy pedestal base, a tubular body secured to the base and a urinal holder supported at the upper end of the tubular body releasably holding a urinal member at the bedside of a patient. The urinal holder consists in a thin, circular retaining plate having vertically disposed resilient clip portions occurring in spaced relation around the outer edges of the retaining plate. At its central portion the plate is formed with a conically shaped hollow fitting engageable in an upper end of the tubular body. The parts noted are detachably secured together by an elongated bolt member and hexagonal nuts occurring in recessed relationship in the conically shaped fitting in the bottom of the pedestal base.

Rice, Sr., U.S. Pat. No. 4,597,550 describes a potted plant display stand for displaying a small potted plant at angles, varying from 20 to 70 degrees to the horizontal, for fuller viewing by a bedridden patient. The base of the stand is a hollow, dome-like shell, circular in shape, for placing the stand securely on a horizontal surface. The base is constructed (preferably molded) of thin material, such as plastic, for lightness and to facilitate the nesting of two or more stands in a reduced space. The potted plant is held in a cup-like circular recess in the side of the stand which recess is slightly larger in circumference than the outer circumference of the pot being held. The circular recess has a narrow overhanging lip across the top to frictionally hold the pot in place. A hollow area beneath the circular recess permits the nesting of stands of like dimensions, one on top of another the modification of circular recess dimensions permits the nesting of smaller stands within slightly larger stands.

Revette et al., U.S. Pat. No. 5,094,415 describes an apparatus for mounting a container, and particularly a container of baby food for convenience of dispensing the contents of the container. The organization includes a suction cup support base, with a support leg directed upwardly therefrom, with a plurality of 'U'-shaped frameworks arranged at 90 degrees relative to one another, each mounted orthogonally and in alignment relative to the support leg. The 'U'-shaped legs include a plurality of semi-cylindrical support rings at an upper terminal end of one of said 'U'-shaped frames, with the semi-cylindrical support rings including spring connections therebetween to define a cylindrical configuration that may be expanded for accepting a container therewithin. A modification of the invention includes a suction cup support mounted to an intersection defined by the 'U'-shaped frames in alignment with the support leg, and further including a utensil support mounted to the leg.

Harrington, U.S. Pat. No. 5,732,830 describes a vase including a clamping apparatus within the vase body having a pair of jaw members which will selectively clamp together to retain flower stems in position within the vase body. A lock mechanism is mounted on the vase and operable to selectively operate the clamping mechanism to either clamp the flowers in position or release the flowers.

Sellers, WO 92/10085 describes a rigid planar support for an individual potted plant which preserves carpet pile preventing matting, permanent carpet crush and stains. The plant pot support is comprised of a molded plastic disk having a plurality of strategically shaped, sized and located support legs which are semicircular cavities vertically and arcuate shaped horizontally to provide maximum possible weight distribution and weight support for a heady potted plant while distributing the weight on the support legs to minimize the pressure on the carpet pile and jute backing of carpet. The plastic material is waterproof to prevent moisture from passing through the disk to the carpet from the plant pot.

The prior art teaches various apparatuses for holding flower arrangements in position within a container body, or supporting plant pots. However, the prior art does not teach that a stand may enable holding of flower arrangements while rigidly clamping the stems with a generally downwardly directed force against the inner wall of the container, thus inhibiting the flowers from being pulled from the stem container in a generally upward direction. The present invention fulfills these needs and provides further related advantages as described in the following summary.

SUMMARY OF THE INVENTION

Flower shops design stands are common place. Florists and others who make floral arrangements with cut flowers, ferns and like, use a variety of means to facilitate efficient manner of holding the flower stems within flower containers, and to ensure easy and quick manipulation of the containers necessary for the flower bouquet designing. However, because of the non-uniform distribution of the flowers supported by the flower containers, and because of the limitations in the existing stands' manipulating options, the intended results of the flower designs is frequently difficult to achieve.

The present invention teaches certain benefits in construction and use which give rise to the objectives described below.

The present invention provides an adjustable bouquet design stand, which includes a positioning device and a flower stems receiver. The positioning device may be adapted for a wall or a floor attachment, and is enabled for being adjusted in height, as well as for a pivotal motion around the stand's longitudinal axis. Additionally, the invention provides for fixed positioning of the flower stems receiver at a desirable altitude. Therefore, the invention enables essentially an infinite number of fixed variations of the flower stand's height and attitude necessary for successful flower bouquet designing. Moreover, the flower stems receiver is provided with a clamping device which has a manual lever located on the flower stems receiver's peripheral wall and is attached to a spring member which is enabled for clamping the flower stems to the inner wall of the stem receiver in a diagonal direction. As the flowers are placed between inner walls of the flower stems receiver, application of pressure by a human hand to the manual lever enables clamping of the flower stems to the inner wall of the receiver with a downwardly directed, and thus a greater clamping force, thereby inhibiting the flowers from being easily pulled from the stems receiver.

A primary objective of the present invention is to provide a ADJUSTABLE BOUQUET DESIGN STAND having advantages not taught by the prior art.

Another objective is to provide a flower stand which enables for manipulation and for the fixed positioning of the flower stems receiver to any selected height and attitude necessary for the flower bouquet designing.

A further objective is to provide a manual clamping device which clamps flower stems to an inner wall of the flower stems receiver with a downwardly directed, and therefore greater than normal, force which enables to inhibit the flowers from being pulled from the stem receiver in a generally upward direction.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
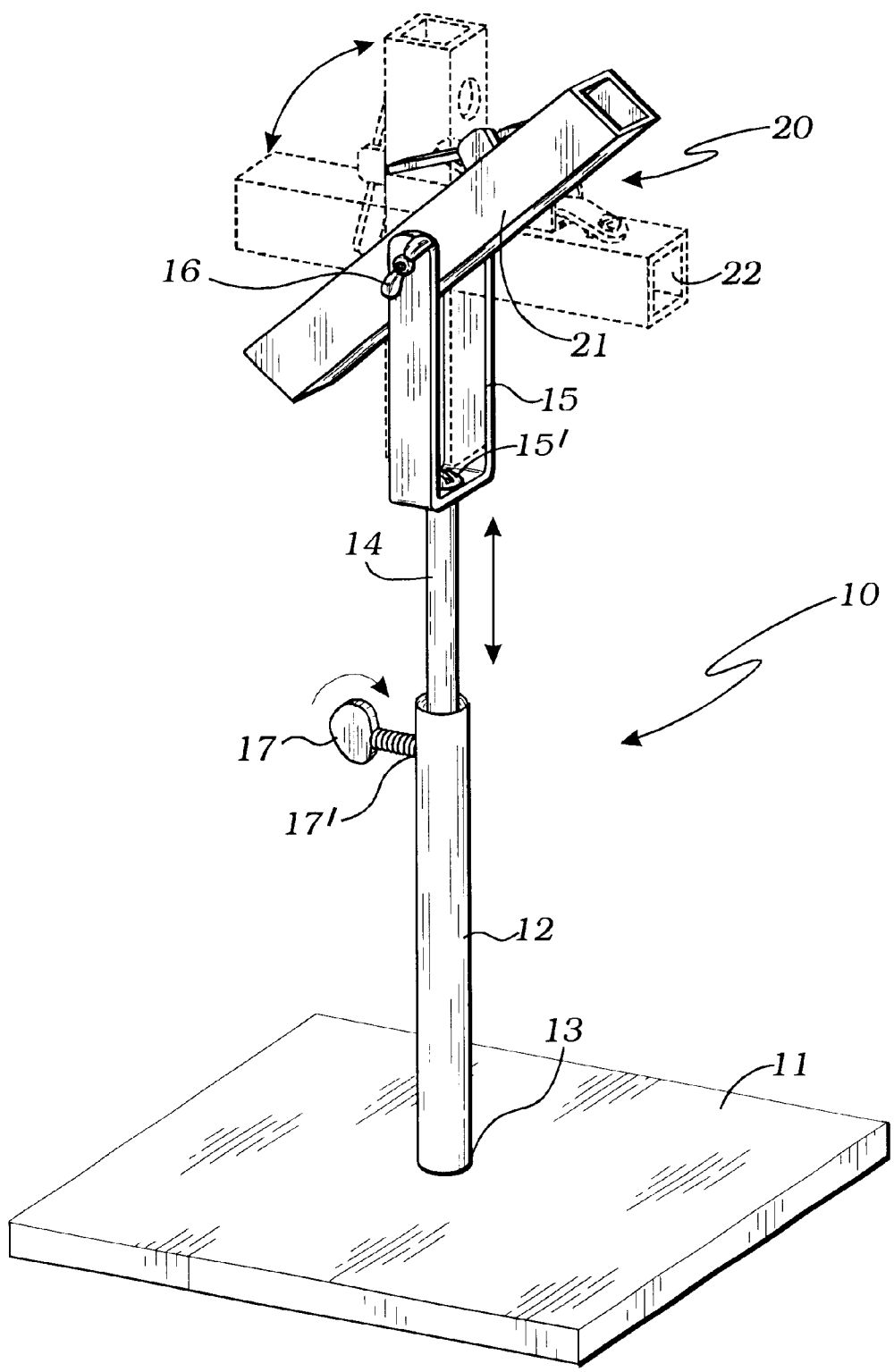
FIG. 1 is a perspective view of the preferred embodiment of the present invention.
Figure 2:
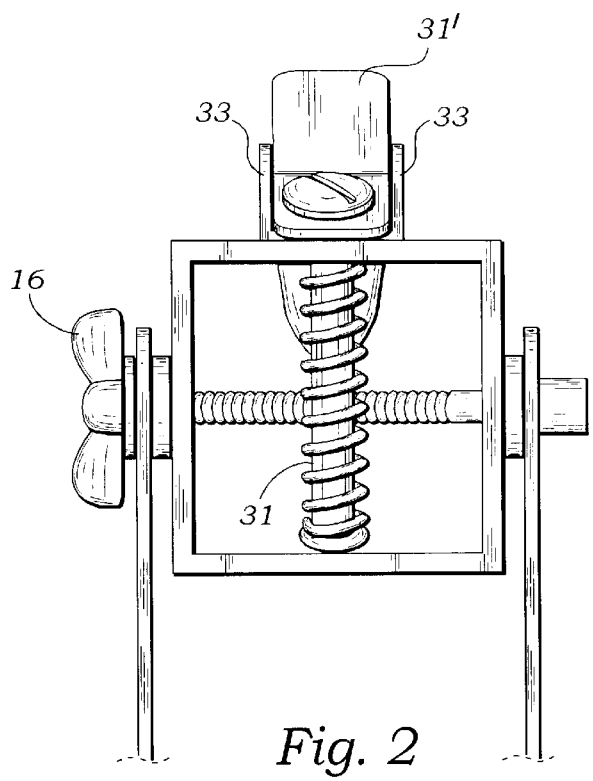
FIG. 2 is a top view showing the clamping means as it is pivotally attached to the positioning means.
Figure 3:
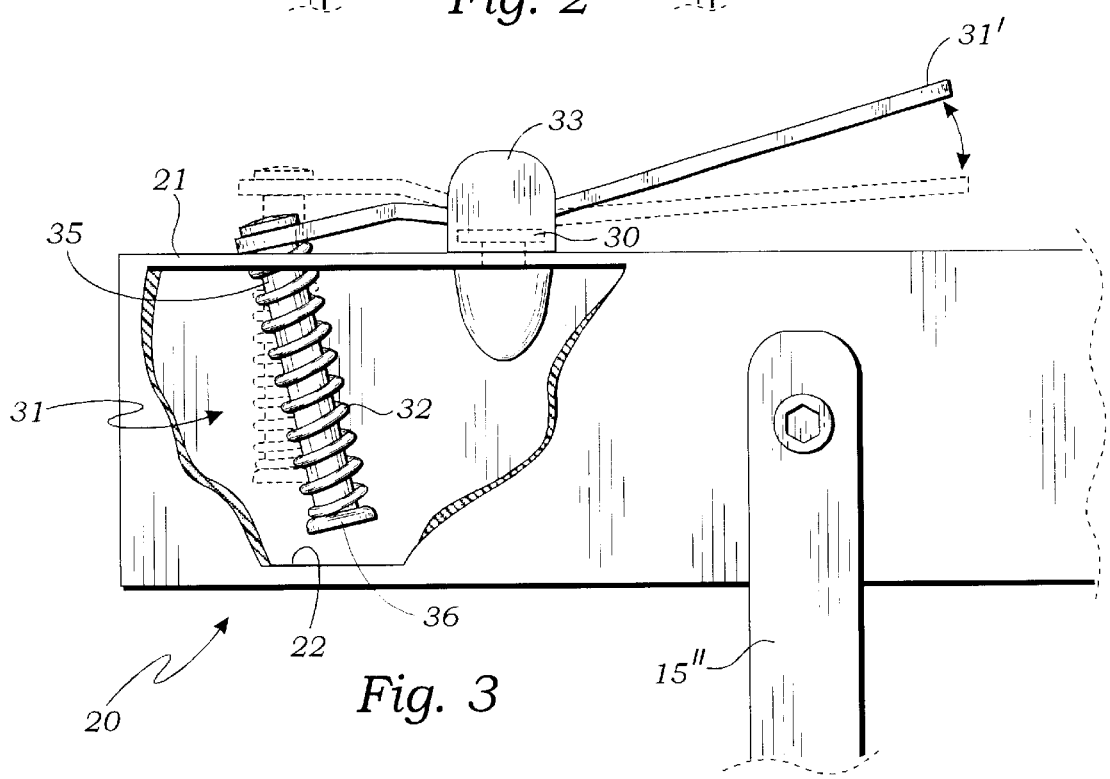
FIG. 3 is a sectional view thereof illustrating the clamping means in action of clamping the flower stems to the inner wall of the flower stems receiver with the downwardly directed force.

The above-described drawing FIGS. 1 through 3 illustrate the invention, an adjustable bouquet design stand. Referring to FIG. 1 an embodiment of the present invention comprises a positioning means, such as positioning stand 10, and a flower stem clamping means 20.

The positioning stand 10 further includes a base 11 which is enabled for standing on the floor, or may be adapted to be attached to a wall. Preferably, the base 11 is a plate made of a heavy metal for enabling secure standing of the invention on the floor in a generally vertical position. Alternatively, the base 11 may be made of a high density plastic of other suitable structural material. The base 11 is provided centrally with an opening 13 from which a support arm 12, fixedly attached at a distal end thereof to the base 11, extends therefrom in a direction generally perpendicular to the base 11. In other embodiments, the support arm 12 may be demountably connected with the base 11, for example, by a threaded attachment to the opening 13.

The support arm 12 may be a single segment 12' or may be preferably comprised of a plurality of separate extensible segments, such as are illustrated in FIG. 1, where tubular segments 12' and 14 are linearly interconnected for structural rigidity by a screw 17. In the preferred embodiment, the segment 12' is a tubular member adapted at a proximate end thereof for receiving, telescopically therein, a distal end of the segment 14, so that the segment 14 is enabled to move linearly within the segment 12'. By releasing the screw 17 from the recess 17', the flower stem clamping means 20 is enabled for height adjustment. Alternatively, the screw 17 may be replaced by a variety of other suitable locking arrangements.

Additionally, the segments 12' and 14 are positioned so that their longitudinal axes coincide with each other and segment 14 is enabled for rotational motion within the segment 12'. Consequently, a still greater manipulation of the flower stems clamping means 20 is achieved. The support arm 12, and its segments 12' and 14, are preferably made of metal. Alternatively, the extensible segments 12' and 14 may be made of a high density plastic or other suitable structural materials.

The positioning stand 10 further includes an engaging frame 15 attached by a means 15' to the extensible segment 14 at a proximal end thereof. In the preferred embodiment the engaging frame 15 is positioned generally above the segment 14. Preferably, the means 15' is a screw which, after thrusting through an aperture in the frame 15, enters in a threaded recess in the proximal end of the segment 14. Alternatively, means 15' may be other suitable locking devices.

The engaging frame 15 comprises at least one arm 15" extending generally in an upright direction from the segment 14. The frame 15 further provides, on the proximal end thereof, screw 16 for interchangeable pivotal and fixed engagement with the flower stems clamping means 20. Preferably, the screw 16 thrusts through the frame 15 and at least one peripheral wall 21 of the flower stems clamping means 20 as the flower stems clamping means 20 is positioned adjacent to the at least one arm 15" of the engaging frame 15. Thus, when the screw 16 is tightened, the flower stems clamping means 20 is fixedly attached to the engaging frame 15; when the screw 16 is released, the flower stems clamping means 20 is enabled for pivotal motion about the axis of the screw 16, thereby enabling fixed positioning of the flower stems clamping means 20 at a desirable position for flower bouquet designing.

The flower stems clamping means 20 preferably comprises an elongate hollow tubular stems receiver having open opposite ends and positioned to receive flower stems directed generally downwardly between inner walls 21 & 22 of the stems receiver 20. To support the flower stems in a generally upright attitude, the clamping means 20 further provides an arcuately movable jaw 31, as shown in FIG. 3, supported on a peripheral wall of the stems receiver 20.

The flower stem receiver 20 further provides a lever seat 30 rigidly supported by the peripheral wall 21 of the flower stem receiver 20, and an aperture 35 through the peripheral wall 21. The lever seat 30 preferably has a pair of opposing spaced apart integral arms 33 which extend rigidly in essentially parallel juxtaposition in a direction generally perpendicular to the peripheral wall 21, the lever seat 30 being positioned so that the aperture 35 receives the arcuately movable jaw 31. In the preferred embodiment the stem receiver 20, lever seat 30 and jaw 31 are made of lightweight metal. Alternatively, these members may be made of high density plastic or other suitable structural materials.

The arcuately movable jaw 31 is connected at one end of a curved manual lever 31' pivotally engaged with the lever seat 30, the lever seat 30 providing support for rotating motion of the manual lever 31'. One end of the manual lever 31' is rigidly attached, through the aperture 35, to a biasing member 32 positioned inside of the stem receiver 20. The biasing member 32 further provides a clamping surface 36 and is positioned so as to direct the clamping surface 36 linearly, and non-normally against an inner surface 22 of the stems receiver 20. Thus, when pressure is applied to the manual lever 31', the biasing member 32 is compressed and reacts with a downwardly directed force applied to the clamping surface 36. Consequently, the manual lever 31', the lever seat 30 and the biasing member 32 move with a single motion enabling the clamping surface 36 to clamp the flower stems against the inner surface 22 so as to inhibit the flowers from being pulled from the stem receiver 20 in a generally upward direction.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
   a positioning means engaged with, and enabled for manipulation to a selected fixed position, a flower's stems clamping means;
   the flower's stems clamping means providing a stems receiver for supporting flowers in a generally upright altitude with corresponding flower stems directed generally downwardly, and, supported on the stems receiver, an arcuately movable jaw enabled for clamping the flower stems with a downwardly directed clamping force so as to inhibit the flowers from being pulled in a generally upward direction;
   wherein the stems receiver is an elongated tubular member having open opposite ends and wherein the arcuately movable jaw comprises:
   a manual lever rigidly attached to a biasing member, the biasing member providing a linear, downwardly directed clamping surface; and
   the manual lever and the biasing member joined such that when pressure is applied to the manual lever, the clamping surface is enabled to clamp the flower stems against the inner wall of the stems receiver with a downwardly directed force.

2. The apparatus of claim 1 wherein the positioning means is enabled for linear extension.

3. The apparatus of claim 1 wherein the positioning means is enabled for rotation.

4. The apparatus of claim 1 wherein the positioning means is enabled for pivotal motion.

5. The apparatus of claim 1 wherein the positioning means is enabled for linear extension, rotation and pivotal motion.

6. The apparatus of claim 2 wherein the positioning means comprises a support arm, the support arm further comprising at least two telescopically engaged elements enabled by a position setting means mounted thereon for linear adjustment in height of the flower's stems clamping means.

7. The apparatus of claim 3 wherein the positioning means comprises a support arm providing two elements positioned axially for rotation of one of the two elements within the other of the two elements.

8. The apparatus of claim 4 wherein the positioning means comprises an engaging frame pivotally engaged with the flower's stems clamping means and enabled for locking the clamping means at a selected angle through an angle setting means.

9. The apparatus of claim 5 wherein the positioning means further comprises:

a support arm providing at least two telescopically engaged elements positioned axially for rotation of one of the two elements within the other of the two elements and enabled for linear adjustment in height by a position setting means mounted on the support arm;

an engaging frame rigidly attached to the flower's stems support arm and pivotally engaged with the flowers' stems clamping means so as to enable locking of the clamping means at a selected angle through an angle setting means positioned on the engaging frame, the support arm and the engaging frame thereby providing for free manipulation and fixed positioning of the flower's stems clamping means at any desirable height, rotational position and altitude.

* * * * *